United States Patent [19]
Italiano et al.

[11] 3,790,114
[45] Feb. 5, 1974

[54] FAN MOTOR MOUNT

[75] Inventors: Frank Italiano, Liverpool; Curtis L. Tobin, Chittenango; William C. Martin, Jr., Syracuse; Fred V. Honnold, Jr., North Syracuse, all of N.Y.

[73] Assignee: Carrier Corporation, Syracuse, N.Y.

[22] Filed: Jan. 10, 1972

[21] Appl. No.: 216,398

[52] U.S. Cl. .................. 248/13, 248/14, 248/44
[51] Int. Cl. ............................................ F16m 11/04
[58] Field of Search ..... 248/48, 13, 14, 44, 26, 225, 248/15, 165; 416/244, 500; 62/508; 310/91

[56] References Cited
UNITED STATES PATENTS
2,728,541  12/1955  Hansel .......................... 416/500 X
2,096,621  10/1937  Skolfield ......................... 248/26 X
2,522,156  9/1950  Balmer ................................ 248/48

FOREIGN PATENTS OR APPLICATIONS
291,836  12/1931  Italy ..................................... 416/244
690,432  4/1940  Germany ............................ 416/244
545,486  5/1942  Great Britain ....................... 248/44

Primary Examiner—Roy D. Frazier
Assistant Examiner—Richard L. Stroup
Attorney, Agent, or Firm—D. Peter Hochberg

[57] ABSTRACT

A motor mounting assembly for securing and accurately positioning a motor relative to a base member, the elements of the mounting assembly being secured to the motor, the base member and to each other by a single fastener.

3 Claims, 3 Drawing Figures

PATENTED FEB 5 1974

FAN MOTOR MOUNT

BACKGROUND OF THE INVENTION

Numerous products, such as air cooled refrigeration systems, employ propeller-type fans wherein the fan is mounted directly on the motor shaft, due to the low initial cost, compactness and ease of location within or on the product. Ordinarily, the motor is positioned by a suitable support bracket which may be attached to the fan orifice plate. The support brackets may be formed of a plurality of elements including a motor mounting bracket or clamp and a plurality of arms adapted to be fastened to the fan orifice plate. The support bracket is ordinarily preassembled by suitable means such as welding. Fasteners may be employed to secure the arms on the orifice plate and to secure the fan motor to the motor clamp or bracket. Accurate positioning of the motor relative to the motor support bracket clamp for proper positioning of the fan relative to the fan orifice may require extra manpower on the assembly line to hold the motor in position while the motor clamp is being tightened thereon.

Further, the support arms of motor mounts which are fastened to the fan orifice plate adjacent the fan blade tips create turbulence in the air passing thereover to or from the fan thereby generating noise and reducing fan efficiency.

It is therefore desirable to provide a motor mounting assembly which obviates the necessity of preassembly, requires a minimum number of assembly fasteners, requires a minimal amount of manpower for assembly and provides a minimum obstruction to the flow of air adjacent the motor.

SUMMARY OF THE INVENTION

This invention relates to a motor mount assembly for positioning and securing a motor including a plurality of leg members, each having first tab means formed at first or lower extremity for locking engagement with a base member. Second tabs means are provided on the upper extremities of the legs for engagement with clamp means for positioning the legs relative to the clamp means, the clamp means being adapted for engagement with the motor for positioning and securing the motor relative to the base member.

DESCRIPTION OF THE PREFERRED EMBODIMENT

Figure 1:
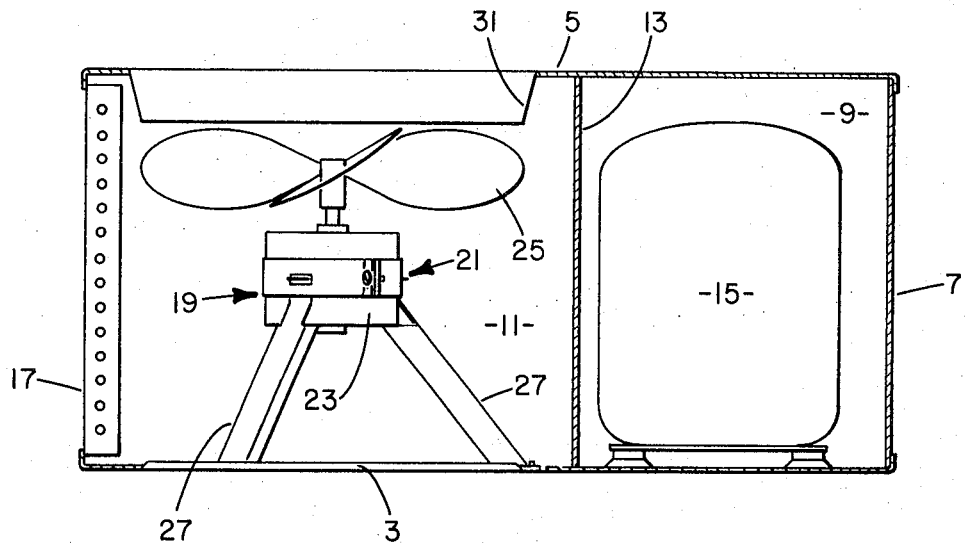
FIG. 1 is a view of a fan motor mount disposed in a refrigeration system condensing unit.
Figure 2:
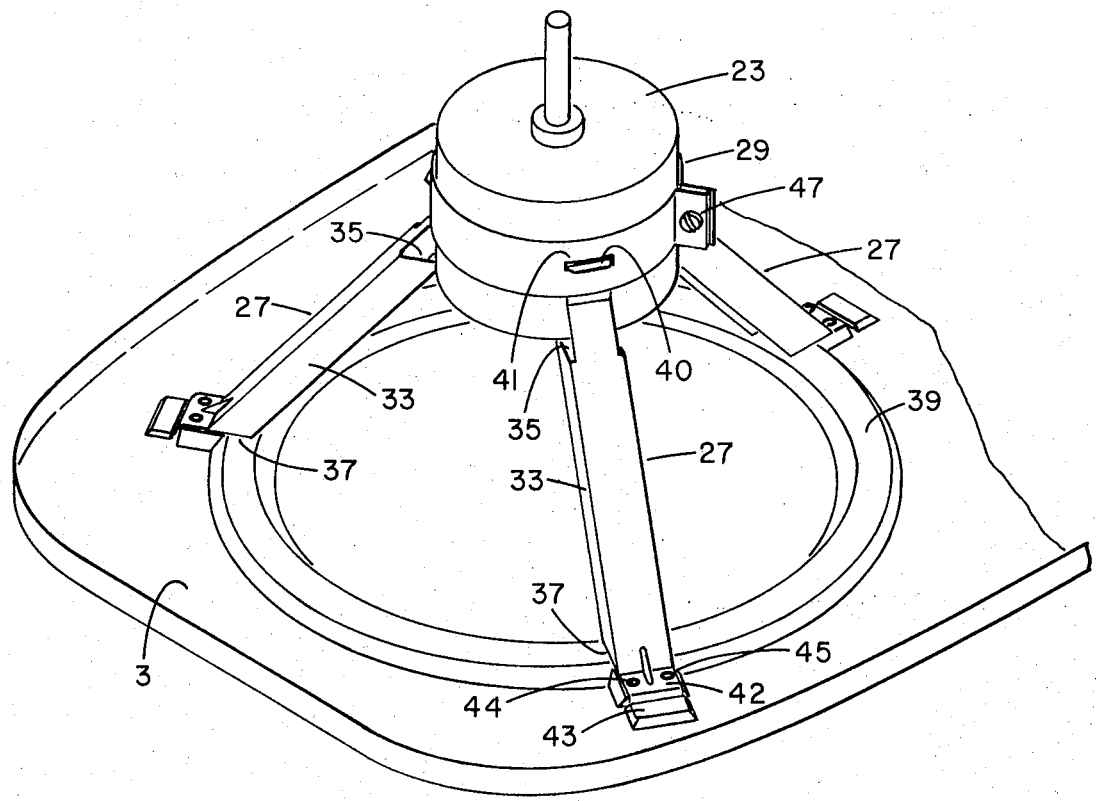
FIG. 2 is a perspective view of the fan motor and motor mount assembled on the base member of the condensing unit.
Figure 3:
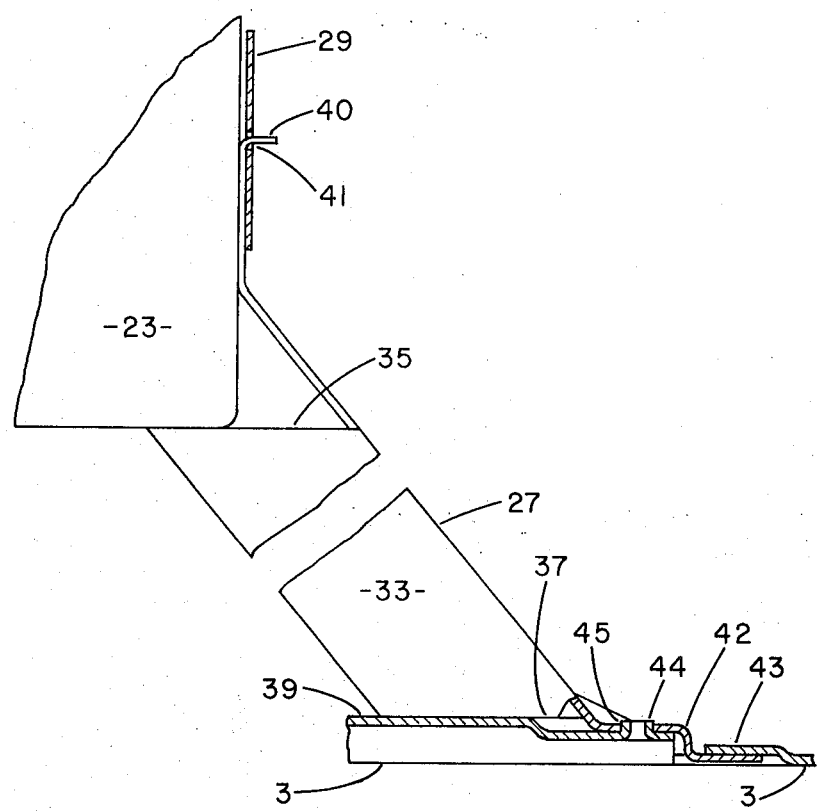
FIG. 3 is a view partially in section, illustrating a portion of the base member, motor support leg, and a portion of the motor clamp.

Referring to the drawings there is illustrated a condensing unit for use in an air conditioning system comprising a base pan or support member 3. a cover panel 5 and a side panel 7. The condensing unit is divided into a compressor section 9 and a condenser section 11 by a vertical partition member 13. A compressor 15 and suitable controls (not shown) are mounted within compressor section 9. A condenser coil 17 and a condenser fan assembly 19 including motor mount 21, fan motor 23 and fan 25 are mounted within the condenser section 11.

The motor mount, which is comprised of legs 27 and a motor clamp 29, is adapted to support and position motor 23 relative to fan orifice 31 formed in top panel 5.

Each leg 27 is formed in the shape of a channel member having side walls 33. The side walls 33 terminate in upper edges 35 for supporting motor 23 and lower edges 37 for engagement with a ridge 39 formed in base pan 3 to position legs 27 at the desired angle relative to base pan 3. The upper portion of each leg is provided with a tab 40 adapted for insertion within slots 41 formed in motor clamp 29 to position the motor clamp relative to legs 27. The lower portion of each leg 27 is provided with a suitably formed tab 42 for insertion into a slotted embossment 43 formed within base pan 3. Collars 44 which are formed on embossment 43 are adapted for engagement with suitable openings 45 in tabs 42.

The tabs 42 may be easily inserted within slotted embossment 43 to position the legs at the desired angle and securely lock the legs to the base pan without requiring separate fastening means. The legs are sufficiently secure to allow positioning of the motor clamp 29 on tabs 40. The motor 23 may be slipped into motor clamp 29 and allowed to rest on upper edges 35 of legs 27. A suitable bolt 47 is provided to tighten motor clamp 29 around motor 23 to secure motor clamp 29, legs 27 and motor 23 to positively lock and position the fan assembly within the condenser section 11.

It can be seen from the foregoing that a motor mount assembly is provided which can be easily assembled utilizing one fastener. The motor mount assembly may be quickly positioned within the condensing unit and the fan motor secured thereto by one man thereby greatly decreasing labor costs. Further, by providing the upper edges 35 on legs 27 proper positioning of the motor within the assembly is assured. By providing a motor mount assembly which does not require preassembly, storage space for the motor mount is drastically reduced and the labor required for preassembly is eliminated, resulting in a further savings.

Further, it can be seen that the motor mount assembly is located out of the air flow path between the condenser coil and the fan to prevent turbulence and resultant noise generation which could be caused thereby.

While we have described the preferred embodiment of our invention, it should be understood that the invention is not limited thereto, but may be otherwise embodied within the scope of the following claims.

We claim:

1. A motor mount for positioning and securing a motor on a base member, said motor mount comprising:

a plurality of legs, each leg having a first tab at one end of the leg for engagement with the base member, a second tab at the opposite end of the leg for engagement with the motor, and motor support surfaces configured to cooperatively engage the motor for positioning the motor relative to the base member, and said legs being formed in the shape of channel members having opposing, connected side walls, the side walls terminating at the ends of said legs carrying said second tabs in edges short of the latter ends of said legs to form said motor support surfaces; and clamping means for clamping said legs to said motor, said clamping means having a plurality of receptacles for receiving the second tabs of said legs and means for tightening said clamping means against the second tabs received in said receptacles for securing the tabs to the motor.

2. A motor mount according to claim 1 wherein the side walls of said channel member terminate at the ends of said legs carrying said first tabs short of the latter ends to form edges on said side walls configured for engaging said base member to support said legs at a desired angle relative to said base member.

3. A motor mount assembly for positioning and securing a motor, said assembly comprising:
   a support member having a plurality of adjacent slots and collars;
   a plurality of legs having tab means configured for insertion into said slots, said tab means having openings for receiving said collars when said tab means are inserted in said slots, to lock said legs to said support member; and
   means for securely locking the motor to said legs.

* * * * *